United States Patent
Shih et al.

(10) Patent No.: US 11,485,211 B2
(45) Date of Patent: Nov. 1, 2022

(54) POWERTRAIN ASSEMBLY AND SYSTEMS FOR AUTONOMOUS AND AUTOMATED DELIVERY VEHICLES

(71) Applicant: DoorDash, Inc., San Francisco, CA (US)

(72) Inventors: Harrison Shih, San Francisco, CA (US); Bruce Vest, San Francisco, CA (US); Ilya Polyakov, San Francisco, CA (US); Colton Anderson, San Francisco, CA (US)

(73) Assignee: DoorDash, Inc., San Francisco, CA (US)

( * ) Notice: Subject to any disclaimer, the term of this patent is extended or adjusted under 35 U.S.C. 154(b) by 359 days.

(21) Appl. No.: 16/678,673

(22) Filed: Nov. 8, 2019

(65) Prior Publication Data
US 2021/0138887 A1 May 13, 2021

(51) Int. Cl.
*B62D 6/00* (2006.01)
*B60K 1/04* (2019.01)
*G07C 5/08* (2006.01)
*G06Q 10/08* (2012.01)
*B60P 3/00* (2006.01)
*G05D 1/00* (2006.01)

(52) U.S. Cl.
CPC .............. *B60K 1/04* (2013.01); *B62D 6/00* (2013.01); *G06Q 10/083* (2013.01); *G07C 5/0808* (2013.01); *B60P 3/007* (2013.01); *G05D 1/0088* (2013.01)

(58) Field of Classification Search
CPC .......... B60K 1/04; B62D 6/00; G06Q 10/083; G07C 5/0808; B60P 3/007; G05D 1/0088
See application file for complete search history.

(56) References Cited

U.S. PATENT DOCUMENTS

| 2015/0083509 | A1* | 3/2015 | Borroni-Bird | ........ B60W 10/08 180/204 |
| 2016/0082903 | A1 | 3/2016 | Haggerty et al. | |
| 2021/0046978 | A1* | 2/2021 | Forostovsky | ........ B60K 7/0007 |

* cited by examiner

*Primary Examiner* — Mathew Franklin Gordon
(74) *Attorney, Agent, or Firm* — Kwan & Olynick LLP

(57) ABSTRACT

Described herein are various systems and processes for vehicles for delivery of real-time, on-demand orders for perishable goods, and operations thereof. The vehicles may each include a plurality of different modules that couple to a chassis. The modules may include battery modules, drive modules, cargo modules, and other modules. Each drive module may include wheels and motors and steering mechanisms that control the wheels. A plurality of such modules may be disposed on the chassis. The modules may be disposed on different portions of the chassis and be given different operational commands accordingly. Furthermore, operation of the vehicle may be adjusted based on the cargo carried by the vehicle.

20 Claims, 8 Drawing Sheets

POWERTRAIN ASSEMBLY AND SYSTEMS FOR AUTONOMOUS AND AUTOMATED DELIVERY VEHICLES

TECHNICAL FIELD

The present disclosure relates to a logistics platform system for facilitating real-time, on-demand delivery of perishable goods. In one example, the present disclosure relates to automated vehicles implemented for autonomous last-mile deliveries of perishable goods

BACKGROUND

Quick delivery of perishable goods is often crucial to prevent such goods from cooling to unacceptable temperatures or otherwise changing in characteristics in an unacceptable manner. However, delivery platforms need to be adaptable as different customers order different items that may have different handling instructions.

Consequently, it is desirable to provide improved mechanisms for delivery orders, particularly with respect to transportation of real-time on-demand deliveries of perishable goods.

SUMMARY

Provided are various mechanisms and processes for a vehicle for on-demand delivery of perishable goods. In one aspect, which may include at least a portion of the subject matter of any of the preceding and/or following examples and aspects, an automated vehicle is provided comprising a chassis comprising a first end and a second end and a first side and a second side and a plurality of quick release drive modules coupled to the chassis, each drive module comprising a plurality of wheels, a steering mechanism coupled to the plurality of wheels, and a motor configured to power the wheels, wherein at least one of the drive modules is disposed proximate to the first end on the first side, and wherein at least another of the drive modules is disposed proximate to the second end on the first side.

The plurality of drive modules may comprise a first drive module and a second drive module, and wherein the first drive module and the second drive module are disposed in mirrored orientations.

The vehicle may further comprise a battery coupled to the chassis on the first side and configured to power the plurality of drive modules. The battery may comprise a battery electrical connection, wherein the chassis further comprises a chassis electrical connection, and wherein the battery electrical connection is configured to connect to the chassis electrical connection to provide power from the battery to the drive modules. The chassis may further comprise a chassis circuit configured to receive power from the chassis electrical connection and provide power to one or more of the drive modules. The battery may comprise one or more battery electrical connections, wherein each of the plurality of drive modules comprise a drive module electrical connection, and wherein the battery electrical connections are configured to connect to the drive module electrical connections to provide power from the battery to the drive modules.

The vehicle may further comprise a controller communicatively coupled to the plurality of drive modules and configured to provide steering instructions to each of the steering mechanisms and to provide operating instructions to each of the motors. The controller may be configured to: determine a direction of travel of the vehicle, determine a first drive module disposed forward, according to the direction of travel, of a second drive module, and provide steering instructions to the steering mechanism of the first drive module to change the direction of travel of the vehicle. The controller may be further configured to provide steering instructions to the steering mechanism of the second drive module to lock, in a first position, the steering mechanism of the second drive module while operating the steering mechanism of the first drive module. The vehicle may further comprise a user interface communicatively coupled to the controller, wherein the controller is further configured to: receive indication from the user interface associated with an input from a user indicating a category of cargo carried by the vehicle, determine that the category is a first category, and limit, responsive to determining that the category is the first category and via the operating instructions, power output of the motor to a first limit. The controller may be further configured to determine a velocity of the vehicle, wherein the steering instructions are based on the velocity of the vehicle and the determination that the category is the first category. The controller may be further configured to: determine that the category is a second category and limit, responsive to determining that the category is the second category and via the operating instructions, the power output of the motor to a second limit, wherein the steering instructions are based on the velocity of the vehicle and the determination that the category is the second category. The steering instructions may further operate the steering mechanism of the second drive module when causing the vehicle to change the direction of travel. The controller may be disposed on the second side.

Each of the plurality of drive modules may be coupled to the chassis via a catch, toggle clamp, quick release fastener, or threaded fastener.

The motor of each of the drive modules may be at least partially disposed within one of the wheels.

The vehicle may further comprise: a sensor suite disposed on the second side and a cargo container disposed on the second side.

In another aspect, which may include at least a portion of the subject matter of any of the preceding and/or following examples and aspects, a method may be provided. The method may comprise: receiving a vehicle, wherein the vehicle comprises: a chassis comprising a first end and a second end and a first side and a second side and a plurality of quick release drive modules coupled to the chassis, each drive module comprising a plurality of wheels, a steering mechanism coupled to the plurality of wheels, and a motor configured to power the wheels, wherein at least one of the drive modules is disposed proximate the first end on the first side, and wherein at least one of the drive modules is disposed proximate the second end on the first side; determining that at least one of the drive modules is faulty; releasing the faulty drive module from the chassis; and replacing the faulty drive module.

The method may further comprise releasing a battery from the chassis and replacing the battery.

The method may further comprise providing an input indicating a category of cargo carried by the vehicle through a user interface of the vehicle, wherein the vehicle is configured to operate based on the category.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
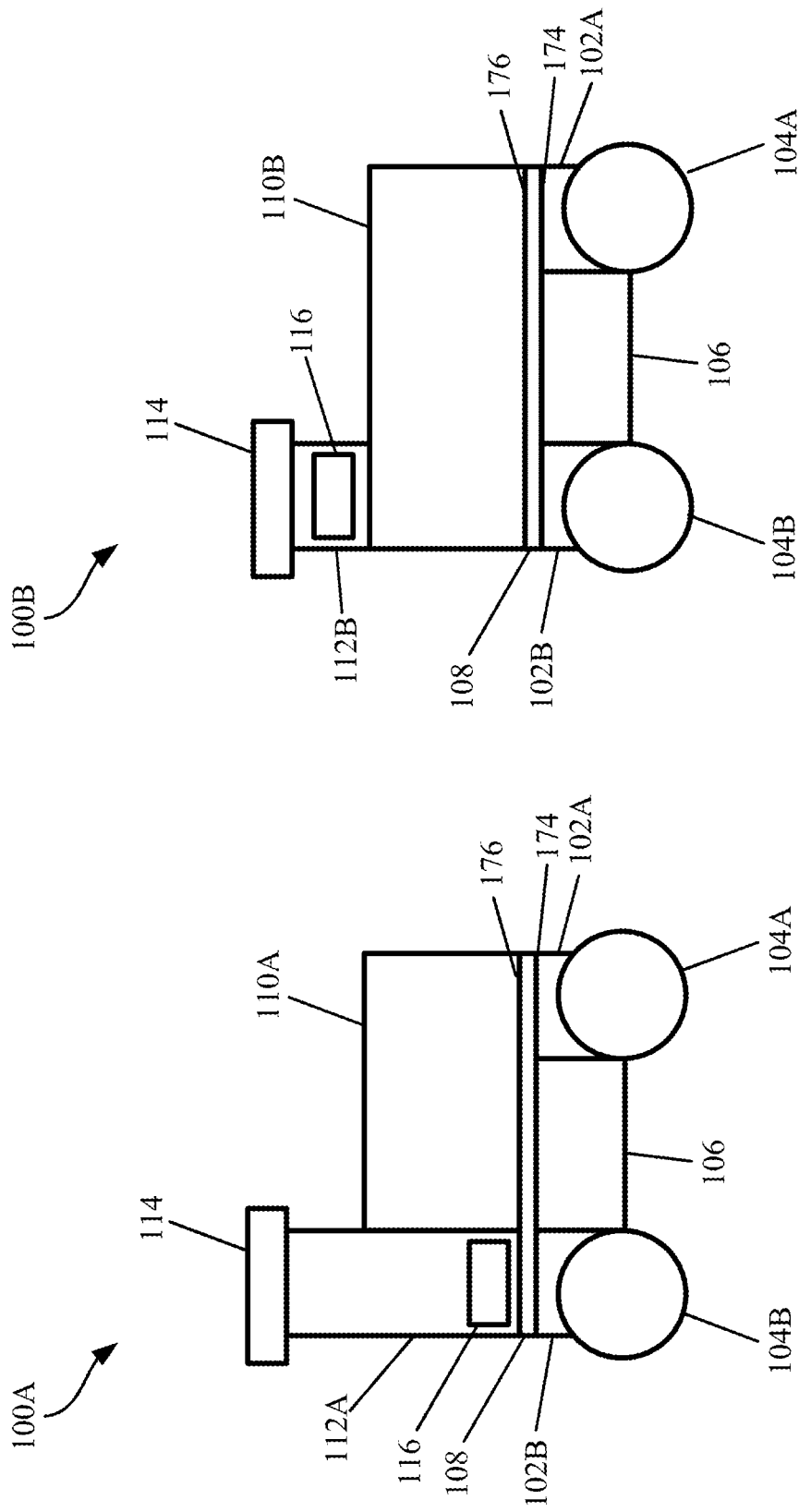
FIG. 1A illustrates an automated perishable goods delivery system, in accordance with one or more embodiments.
FIG. 1B illustrates another automated perishable goods delivery system, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present invention will be described in the context of particular protocols, such as Wi-Fi or Bluetooth®. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

With regard to the present disclosure, logistics platforms managing real-time on-demand deliveries of perishable goods rely on accurate location, status, and routing mechanisms to allow for effective and efficient delivery experiences between providers and customers. In particular, providers located in a variety of disparate locations, particularly highly congested disparate locations, may make it difficult for couriers and delivery people to easily pick up perishable goods from these locations. These may be restaurants located in high traffic areas with limited parking. As used herein, the term "provider" may be used to describe various types of merchants that provide goods, including perishable goods, and the terms "provider" and "merchant" may be used interchangeably. As used herein, the term "delivery associate" may be used to describe a driver or courier that is delivers the goods provided by the merchant to a customer, and the terms "delivery associate" and "courier" may be used interchangeably.

Overview

The systems and methods described herein improve last-mile delivery of perishable goods from a merchant to a customer. Last-mile delivery generally refers to the movement of goods from a transportation depot or hub or merchant (e.g., storefront) to a final delivery destination. According to various embodiments, a depot dispatch protocol may be implemented where orders are transported between one or more aggregation depots, including merchant depots and customer depots, along last-mile delivery routes to the final destinations.

In various other embodiments, the systems and methods described herein may be utilized during intermediate delivery of goods. Intermediate delivery may include, for example, delivery from a provider of goods to a hub or depot. Thus, goods may be loaded onto the vehicle described herein by the provider and the vehicle may then be delivered to the hub or depot. After unloading at the hub or depot, the goods may then be loaded for last-mile delivery from the hub or depot.

Systems and methods herein describe an automated delivery system for perishable goods. The automated delivery system described herein may be a vehicle that includes a chassis and various modules for propulsion, battery storage, control, storage, sensing, and other functions. Such modules may be quick release modules that allow for quick removal and replacement. In certain embodiments, modules associated with operation of the vehicle may all be disposed on one side of the chassis while modules associated with delivery of items may be disposed on a second side of the chassis. Such a layout may simplify service and operation of the vehicle as servicing of the vehicle can be performed entirely from one side.

In certain embodiments, the vehicle may include a plurality of drive modules. For example, a drive module may include an axle of the vehicle and vehicles with a plurality of axles may include a corresponding plurality of drive modules. Each drive module may be a module that includes a steering mechanism, wheels, suspension coupled to the wheels, a motor to drive the wheels, and other systems. The drive modules may be modular and may be configured to be disposed at any location on the chassis that is configured to receive a drive module. Thus, the chassis may include multiples of the same type of drive module, allowing for only one drive module to be stocked for repair and maintenance.

The drive modules may be installed in different locations according to different orientations. For example, a drive module installed on the front of the vehicle may be installed facing a first direction and a drive module installed on the rear of the vehicle may be installed facing a second direction. Thus, drive modules on different ends of the vehicle may be installed in mirrored orientations. The mirrored orientations may allow for better maneuverability of the vehicle.

Example Embodiments

FIG. 1A illustrates an automated perishable goods delivery system, in accordance with one or more embodiments. FIG. 1A illustrates a vehicle 100A that includes a chassis 108, quick release drive modules 102A and 102B, battery module 106, sensor module 114, control module 112A, and cargo module 110A.

In various embodiments, vehicle 100 may be a vehicle with an operational profile similar to that of a bicycle or an electric bicycle. That is, vehicle 100 may be of a size (e.g., length or width) that can operate in bicycle lanes. Such a small width may also allow vehicle 100 to operate on sidewalks and other pedestrian walkways. Additionally, the various systems and techniques described herein may allow for vehicle 100 to be able to turn tightly (e.g., have a turning radius of five feet or less) and operate at speeds required for quick and efficient delivery (e.g., a top speed of 25 miles per hour or more) and operate in a variety of weather conditions and temperature ranges.

In the present example, vehicle 100 is managed by a logistics platform for real-time, on-demand, delivery of perishable goods. For instance, a customer may order food from a restaurant by using a mobile device application that places the order through the logistics platform associated with the logistics platform. In some instances, the user may also access the logistics platform through the interne via a computer, laptop, tablet, etc. When the customer orders the food through the logistics platform, the order is prepared at a provider site associated with the logistics platform. The provider may load orders into vehicle 100 for delivery. After vehicle 100 has been loaded, vehicle 100 may then be operated (either fully autonomously or remotely controlled) to deliver the order to the customer. In certain embodiments, one or a plurality or orders may be loaded by one service provider into vehicle 100, but other embodiments may have vehicle 100 stopping by multiple service providers to receive one or more orders from each service provider before the orders are delivered.

According to various examples, a provider may be a merchant that prepares perishable goods such as food at a restaurant. Other such merchants may be any combination of one or more of the following: restaurants, bars, cafes, or other vendor of food or beverages, such as a hotel.

In some examples, provider sites may also provide other perishable goods such as floral arrangements, medications, refrigerated or frozen items, live animals, etc. that may need real-time, on-demand delivery to a customer. Accordingly, although various examples in the present disclosure may describe the provider sites and logistics platform in the context of restaurants and food delivery, the mechanisms and processes described herein may also be applied to the delivery of various other perishable items. As used herein, the terms "provider" and "merchant" may be used interchangeably.

The modules described herein can each be coupled to the chassis 108 through one or more quick release connections. The quick release connections allow for the quick release modules to be mechanically secured to chassis 108 and communicatively coupled to chassis 108 and/or control module 112A. Thus, such quick release connections may include mechanical connections (e.g., fasteners that, when secured, prevents the module from decoupling from chassis 108), electrical connections (e.g., one or more connectors that can provide electrical power), and data connections (e.g., one or more connectors that can communicate data).

Drive modules 102A and 102B may each include one or more wheels 104A and 104B, respectively, as well as steering mechanisms, motors, suspension, and other components described herein. The steering mechanisms are coupled to the wheels to allow steering control of vehicle 100A. The motors are configured to provide motive power (e.g., drive) to the wheels and the suspension can absorb bumps and impacts encountered by vehicle 100A during operation of vehicle 100A.

As shown in FIG. 1A, drive module 102A is disposed on a first end of vehicle 100A and drive module 102B is disposed on a second end of vehicle 100A. In certain embodiments, drive modules 102A and 102B may be substantially similar. In various embodiments, vehicle 100A may be configured to be primarily driven in one or multiple directions. In certain such embodiments, including motors within each of drive modules 102A and 102B may allow for vehicle 100 to be operated in a plurality of directions at substantially the same speed. Additionally, as each of drive modules 102A and 102B include steering mechanisms, either or both ends of vehicle 100 may provide steering control, increasing agility and versatility of vehicle 100. Such a configuration may be useful in, for example, a crowded or urban environment with limited space as vehicle 100 may be able to maneuver within limited spaces without the need to reverse or change directions.

Battery module 106 is an electrical power storage device. Battery module 106 may be configured to power one or more of the motor, steering mechanism, sensors, control systems, and other systems of vehicle 200. Though FIG. 1A illustrates a vehicle 200 with a single battery module, other embodiments may include a plurality of battery modules.

Battery module 106 may include quick release connections and may be coupled to chassis 108. As battery module 106 and drive modules 102A and 102B are items that may require regular service, battery module 106 and drive modules 102A and 102B are disposed on a first side 174 of chassis 108. Such a configuration simplifies service of vehicle 100A as items that require regular servicing may all be disposed on one portion of chassis 108. Thus, any service may only require lifting of vehicle 100A in a certain manner (e.g., to allow a mechanic access to the modules on the bottom of vehicle 100A). Furthermore, service procedures are then standardized as mechanics can be trained to access the bottom of vehicle 100A in all or most service situations, avoiding confusion that results from multiple different service procedures.

As shown, battery module 106 may be disposed between drive modules 102A and 102B. In certain embodiments, battery module 106 may be directly connected to drive modules 102A and 102B (e.g., through quick release connectors). Thus, when drive modules 102A and/or 102B and battery module 106 are coupled to chassis 108, battery module 106 may be electrically coupled to drive modules 102A and/or 102B via such connectors. Thus, battery module 106 may power drive modules 102A and/or 102B.

In other embodiments, battery module 106 may provide electrical power to drive modules 102A and/or 102B via chassis 108. Thus, in such embodiments, chassis 108 may include electrical connections that couple to both battery module 106 and drive modules 102A and/or 102B. As such, battery module 106 may provide electrical power to drive modules 102A and/or 102B via chassis 108 as an intermediate connection. In certain such embodiments, chassis 108 may thus function as a power distributor to various systems of vehicle 100A.

Chassis 108 may provide structural rigidity to vehicle 100. As such, chassis 108 may be, for example, a backbone chassis, a space frame, a monocoque, and/or another type of such chassis. Chassis 108 may include connections to couple to one or more modules of vehicle 100 (e.g., drive modules 102A and 102B, battery module 106, and/or other components). In certain embodiments, chassis 108 may distribute electrical power and data. Thus, for example, battery module 106 may provide electrical power first to chassis 108 before circuitry within chassis 108 distributes the electrical power to other modules. Additionally, control module 112A may provide instructions to drive modules 102A and 102B through data connections disposed within chassis 108. Thus, control module 112A may be communicatively coupled to data circuitry within chassis 108 and such data circuitry may be additionally coupled to drive modules 102A and 102B. Instructions from control module 112A may thus be communicated to drive modules 102A and 102B via chassis 108.

Control module 112A may implement various processing functions for operation of vehicle 100. In some embodiments, instructions and other information may be manually input at user interface 116. Control module 112A may include one or more processors, logic devices, memories, batteries, and other circuitry to receive inputs and determine commands for operation of vehicle 100.

According to particular example embodiments, control module 112A uses memory to store data and program instructions for operations described herein. The program instructions may control the operation of an operating system and/or one or more applications, for example. The memory or memories may also be configured to store received metadata and batch requested metadata. The memory or memories may also be configured to store data corresponding to parameters and weighted factors. In some embodiments, control module 112A further comprises a graphics processing unit (GPU). As described, the GPU may be implemented to process each image obtained by sensor module 114. In some embodiments, control module 112A further includes an accelerator (e.g., a rendering accelerator chip) which may be separate from the GPU. The accelerator may be configured to speed up the processing by processing pixels in parallel to prevent overloading of control module 112A or the GPU. For example, in certain instances, ultra-high-definition images may be processed, which include many pixels, such as DCI 4K or UHD-1 resolution. In some embodiments, the accelerator may only be utilized when high system loads are anticipated or detected.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs, magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Control module 112A may receive and provide data to modules of vehicle 100. In certain embodiments, control module 112A may receive data from such modules and provide instructions for operation of vehicle 100, thus forming a feedback loop. In such embodiments, control module 112A may be communicatively coupled to sensor module 114 and instructions for operation of vehicle 100 may be based on data received from sensor module 114.

Sensor module 114 may include one or more of radar sensors, LIDAR sensors, visual sensors, thermal sensors, magnetic sensors, and/or other such sensors directed towards a certain direction or configured to sense around all of vehicle 100. Sensor module 114 may sense the environment around vehicle 100 and generate data directed to the environment around vehicle 100. Such data may be communicated to control module 112A.

In various embodiments, sensor module 114 may include one or more sensors and other measuring devices. In some embodiments, sensor module 114 includes one or more of a front sensor array, a back sensor array, one or a plurality of side sensor arrays positioned to face the respective sides of vehicle 100. In an example embodiment, side sensor arrays may be positioned to face at least forty-five degrees from the front of vehicle 100. Such sensor arrays may include one or more various sensors for receiving visual, audio, and/or other input to be utilized by onboard computer. As such, sensor arrays may operate to receive information from various areas surrounding the vehicle 100, up to and including three hundred sixty degrees around the vehicle 100.

In various embodiments, the sensor arrays may provide a Light Detection and Ranging (LIDAR) system to provide accurate 3-dimensional (3D) information on the surrounding environment. Using this data, control module 110A may implement object identification, motion vector determination, collision prediction, and vehicle avoidance strategies. The LIDAR unit may be well-suited to provide a 360° view by using a rotating, scanning mirror assembly in sensor module 114.

LIDAR provides raw information using high-speed, high-power pulses of laser-light that are timed with the response of a detector to calculate the distance to an object from the reflected light. An array of detectors, or a timed camera, can be used to increase the resolution of the 3D information. The pulse is very short to enhance depth resolution, and the resulting light reflections are used to create a 3D point-like "cloud" that is analyzed to transform the data into volume identification and vector information. The transformed result is then used to calculate the vehicles' position, speed, and direction relative to these external objects, to determine the probability of collision, and instruct appropriate action, if needed.

Sensor module 114 may extend upwards from chassis 108. The elevated position of sensor module 114 may be configured to place the sensors at an advantageous height to sense and detect objects along a designated route. For example, by placing the sensor module at an approximate height of between three to five feet, the sensor arrays may be able to detect both bicycles and automobiles and other vehicles commonly found on roads or sidewalks, as well as adult and children pedestrians along walkways. Since vehicle 100 may interact with human operators or customers for transport of order items, placing the sensor module at a suitable height will improve detection and recognition of humans.

The sensor module may also be able to detect lower objects or and obstacles at the preferred height. However, in some embodiments, the sensor module may be positioned at any desired height, which may be greater than five feet or lower than three feet. For example, additional sensor arrays may be positioned on lower portions on vehicle 100. Such sensors may be used to improve detection of lower objects, such as curbs or lane lines. For example, radars may be built into the front bumper and other sides of the vehicle 100 to supplement a LIDAR system in functions such as parking, lane changing, or in high traffic areas.

Video images may provide details for a human operator but are also suitable as an input parameter for highly automated driving. In some embodiments, the sensor arrays on sensor module 114 may comprise video cameras to receive visual information for an operator during remote control of the vehicle 100. Such visual information may also be processed by the onboard computer to recognize objects, such as determining lane lines or sensing objects or markers on the road, for example. In some embodiments, motion tracking processing may be implemented to recognize various objects based on the detected movement. Object recognition may also be implemented such that the vehicle 100 may be configured to follow a particular object. Video or still images captured by cameras in the sensor modules may also be used for facial recognition to authenticate operators or customers.

A combination of two-dimensional and three-dimensional imaging may be implemented with image stitching and other processing to provide a 360° view. In some embodiments, the video cameras may be semiconductor charge-coupled devices (CCD) or active pixel sensors in complementary metal-oxide-semiconductor (CMOS) image sensors. Mono and stereo cameras may be used in conjunction with radar systems to provide a precise evaluation of speed and distance as well as the outlines of obstacles and moving objects. Radar sensors for short-range (24 GHz) or long range (77 GHz) may be located in the front and back of the vehicle 100 to monitor traffic. These can monitor ranges from a centimeter up to a few hundred meters.

In some embodiments, sensor arrays in the sensor modules may include ultrasonic sonars, laser scanners, or other suitable sensor types. In some embodiments, sensor module 114 may further include taillights to signal direction changes or other functionalities. Additional signal lights may be located on the body of vehicle 100 for increased visibility and functionality.

Control module 112A may additionally receive such data and determine instructions for operation of drive modules 102A and/or 102B. For example, control 112A may provide instructions to accelerate, brake, or turn the wheels of drive modules 102A and/or 102B based on the data from sensor module 114.

Vehicle 100 may alternatively or additionally be controlled by an operator via remote control. In some embodiments, sensor module 114 may provide visual, audio, or other information to a user device, such as wearable goggles worn by the operator. The operator may obtain surround views of the area surrounding vehicle 100 by using a remote control to pan a moveable camera in the sensor module. In some embodiments, an operator may view the surroundings by turning his head to view a corresponding location around the vehicle 100. In some embodiments, the goggles may provide augmented reality or virtual reality views of the surroundings and provide additional information to the operator.

In some embodiments, a route for vehicle 100 may be determined in real-time. In some embodiments, vehicle 100 may travel along a fixed predetermined route to and from assigned locations. Furthermore, control module 112A may comprise a location and movement sensors, such as a global positioning system (GPS), as well as an inertial measurement unit (IMU) to supplement the GPS with inertial guidance which require no external signals. Such IMU may include Micro-Electro-Mechanical Systems (MEMS) based gyros and accelerometers, spinning-wheel gyros, or a combination thereof. In some embodiments, sensors such as an IMU may also indicate the roll, pitch, and yaw positions of vehicle 100. In some embodiments, control module 112A may also be configured to measure and manage power requirements to control power, overall consumption, and thermal dissipation.

In various embodiments, control module 112A may include a user interface 116. User interface 116 may receive a user input. Such user inputs may be inputs entered through a keyboard or a touchscreen or an audio, visual (e.g., detected by one or more cameras), or other such inputs. User inputs may indicate a desired operating mode of vehicle 100, directions and/or destinations for vehicle 100, category of cargo carried by vehicle 100, and/or other instructions. Control module 112A may provide different instructions based on the user inputs, as described herein. Therefore, a user may indicate that vehicle 100 is carrying cargo that can easily spill, such as soup, and, thus, control module 112A may accordingly operate vehicle 100 with lower amounts of acceleration and cornering forces. Various techniques for controlling vehicle 100 by control module 112A are further described herein.

Cargo may be contained within cargo module 110A. Cargo module 110A may include one or more openings or doors that allow for cargo to be inserted into cargo module 110A. In various embodiments, cargo module 110A may include features to receive pre-determined containers. That is, containers for cargo may be of one or a plurality of containers of one or more a plurality of shapes. Cargo module 110A may include features that receive and hold containers of those shapes.

In various embodiments, cargo module 110A may be configured to store various types of perishable goods for transport. In some embodiments, cargo module 110A may be configured with a heating unit to maintain the stored perishable goods at a desired temperature above the ambient temperature. In some embodiments, a cargo module 110A may be additionally, or alternatively, configured with a refrigeration unit to maintain the stored perishable goods, such as ice cream, dairy, or raw meats, at a desired temperature below the ambient temperature.

In various embodiments, the cargo module 110A may be locked or secured. Cargo module 110A may be accessed by a user, such as merchants, couriers, or customers, using authentication information. In some embodiments, the authentication information may include an access code entered at user interface 116. In some embodiments, the access code may be entered at a corresponding client device and transmitted to control module 112A. In some embodiments, the user may use a corresponding client device to scan a barcode, including Quick Release (QR) codes, on vehicle 100 to unlock cargo module 110A. In some embodiments, sensor module 114 may include a camera for scanning a barcode generated at the client device. In yet further embodiments, the client devices may wirelessly communicate with vehicle 100 to unlock and access cargo module 110A such as via Wi-Fi, Bluetooth®, or RFID. In some embodiments, the system may utilize wireless beacons to unlock the storage compartment when it is determined that vehicle 100 has arrived at a particular location, such as a merchant location or depot. In some embodiments, a user may be authenticated via facial recognition by capturing and analyzing an image of the user via a camera or other sensor of vehicle 100.

FIG. 1B illustrates another automated perishable goods delivery system, in accordance with one or more embodiments. FIGS. 1A and 1B illustrates different embodiments of vehicle 100. In FIG. 1A, sensor module 114 may be disposed above control module 112A. Control module 112A may form a mast, or a portion thereof, from which sensor module 114 is mounted at or near the top. Such a mounting position may allow sensor module 114 to have longer ranges. Due to the mast configuration, cargo module 110A in FIG. 1A is disposed forward of the mast. Such a configuration may allow for cargo module 110A to be removed as a complete unit.

In FIG. 1B, control module 110B and sensor module 114 may be mounted on top of cargo module 110B. Accordingly, cargo module 110B may be as long as the entire length of vehicle 100. With control module 110B and sensor module 114 disposed above cargo module 110B, cargo may be loaded into cargo module 110B. Alternatively, cargo module 110B may be removed as a complete unit with control module 110B and sensor module 114 attached. As such, cargo module 110B may include electrical power and/or data connections. Connecting cargo module 110B to chassis 108 may thus include connecting the electrical power and data connections of cargo module 110B to chassis 108.

Figure 2:
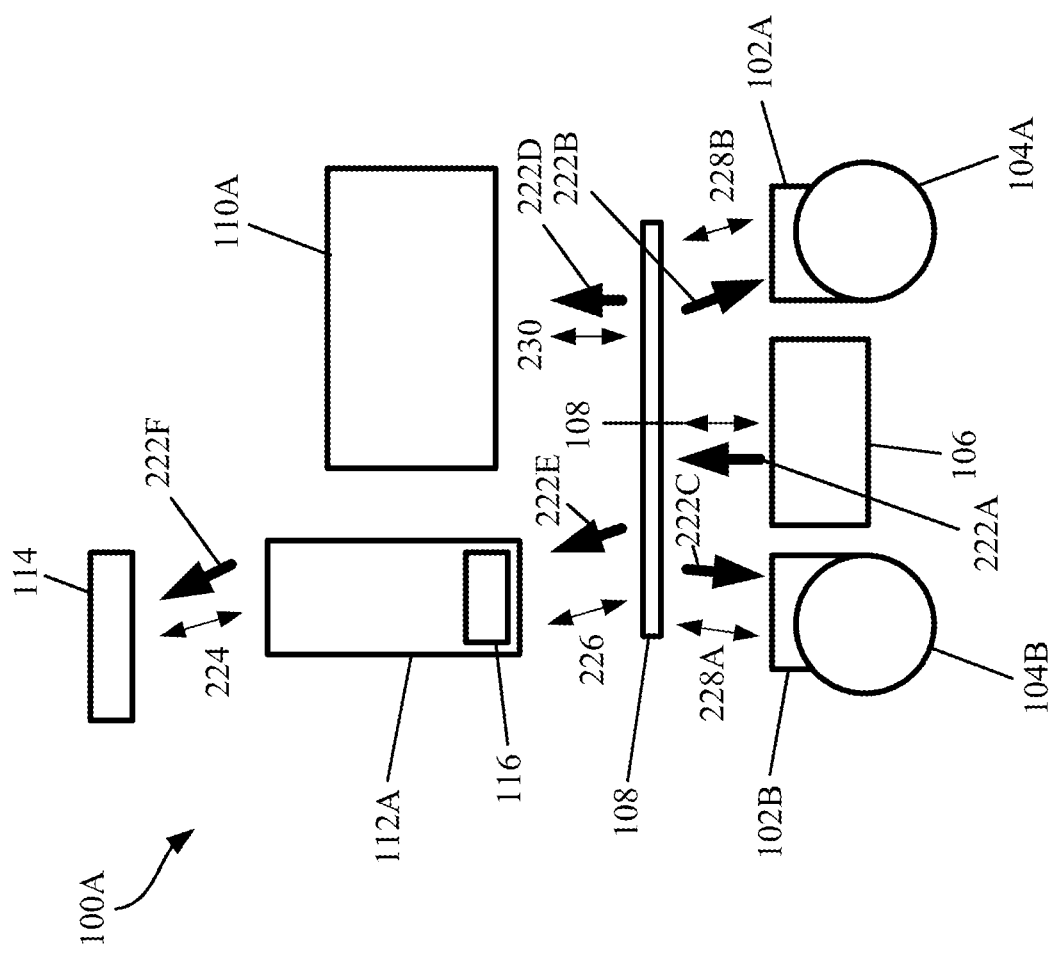
FIG. 2 illustrates a representation of various components of an automated perishable goods delivery system and data flow between the components, in accordance with one or more embodiments.

Accordingly, data may be communicated and electrical power may be provided between various modules of vehicle 100. FIG. 2 illustrates a representation of various components of an automated perishable goods delivery system and data flow between the components, in accordance with one or more embodiments. FIG. 2 illustrates an exploded component view of vehicle 100A.

FIG. 2 illustrates that electrical power 222A may be provided from battery module 106 to chassis 108. Chassis 108 may then accordingly provide electrical power 222B-E to drive modules 102A and 102B, cargo module 110A, and control module 112A, respectively. As such, chassis 108 may include circuitry that provides power to the modules and one or more electrical power connectors configured to interface with corresponding connectors within the modules. Chassis 108 may, accordingly, include components that effectively function as a bus bar to the various modules of vehicle 100. In certain embodiments, control module 112A may provide electrical power 222F to sensor module 114, but other embodiments may also include chassis 108 providing electrical power to the sensor module. Electrical power 222A-F may power various components of vehicle 100 such as electrical motors, steering mechanisms, processors, sensors, temperature control systems (e.g., for cargo module 110A), and other such systems.

Additionally, data can be communicated between the various modules of vehicle 100. Similar to electrical power, chassis 108 may communicate data from one module to another. Thus, for example, data 224 (e.g., sensor data) may be communicated between sensor module 114 and control module 112A. Furthermore, data 230 may be data readings from or operating instructions to cargo module 110A, as described herein.

Data 226 can be communicated between control module 112A and chassis 108. Data 226 can include, for example, data from one or more sensors of drive modules 102A and/or 102B (e.g., from yaw or wheel slip sensors), data from battery module 106 (e.g., battery level data or battery temperature readings), instructions for operation of drive modules 102A and 102B (e.g., for operating motors and/or steering mechanisms of drive modules 102A and 102B), data readings from within cargo module 110A (e.g., temperature readings or thermal camera readings), data for operation of cargo module 110A, and/or other such data. Data 228A and 228B may be communicated between chassis 108 and drive modules 102A and 102B, respectively. Data 228A and/or 228B may include such sensor readings and operating instructions as described herein. Thus, in certain embodiments, sensor readings may be communicated from drive modules 102A and/or 102B as data 228A and/or 228B to chassis 108 and then from chassis 108 to control module 112A as data 226. Chassis 108 may thus be an intermediary for the data. In various embodiments, the data 224, 226, 228A, 228B, and 230 may be data communicated through wired connections and/or data communicated through wireless connections (e.g., data communicated through Bluetooth® communications).

Operating instructions for drive modules 102A and/or 102B communicated through data 226, 228A, and/or 228B may include instructions for operation of motors of drive modules 102A and/or 102B (e.g., to provide drive to vehicle 100). In other embodiments, such data may include instructions for commanding drive modules 102A and/or 102B to brake. In various embodiments, as described herein, braking of drive modules 102A and/or 102B may be performed through conventional brakes (e.g., disc brakes) and/or through electric motor braking (e.g., by causing electric motors to be in an energy regeneration mode).

In various embodiments, the modules described herein may be sealed for protection against the environment. For example, the modules may meet Ingress Protection ratings, such as IP65 (dust tight) ratings.

The modular nature of the various modules allow for the modules to be assembled, tested, and tuned separately from each other and from vehicle 100 as a unit. Additionally, the various modules may be quickly replaced while vehicle 100 is in service or within a service facility. In various embodiments, the modules may be coupled to chassis 108 with fasteners that do not require special tools or a robotics lab to manipulate or remove. In certain such embodiments, coupling techniques that do not require tools to manipulate, such as catches or toggle clamps, may be used to allow for service without tools at all. Modules can be removed and replaced as a unit and defective modules can be sent to an off-site service center for repair. Such a configuration allows for vehicle 100 to be available for a greater amount of time and minimizes downtime due to service.

Figure 3:
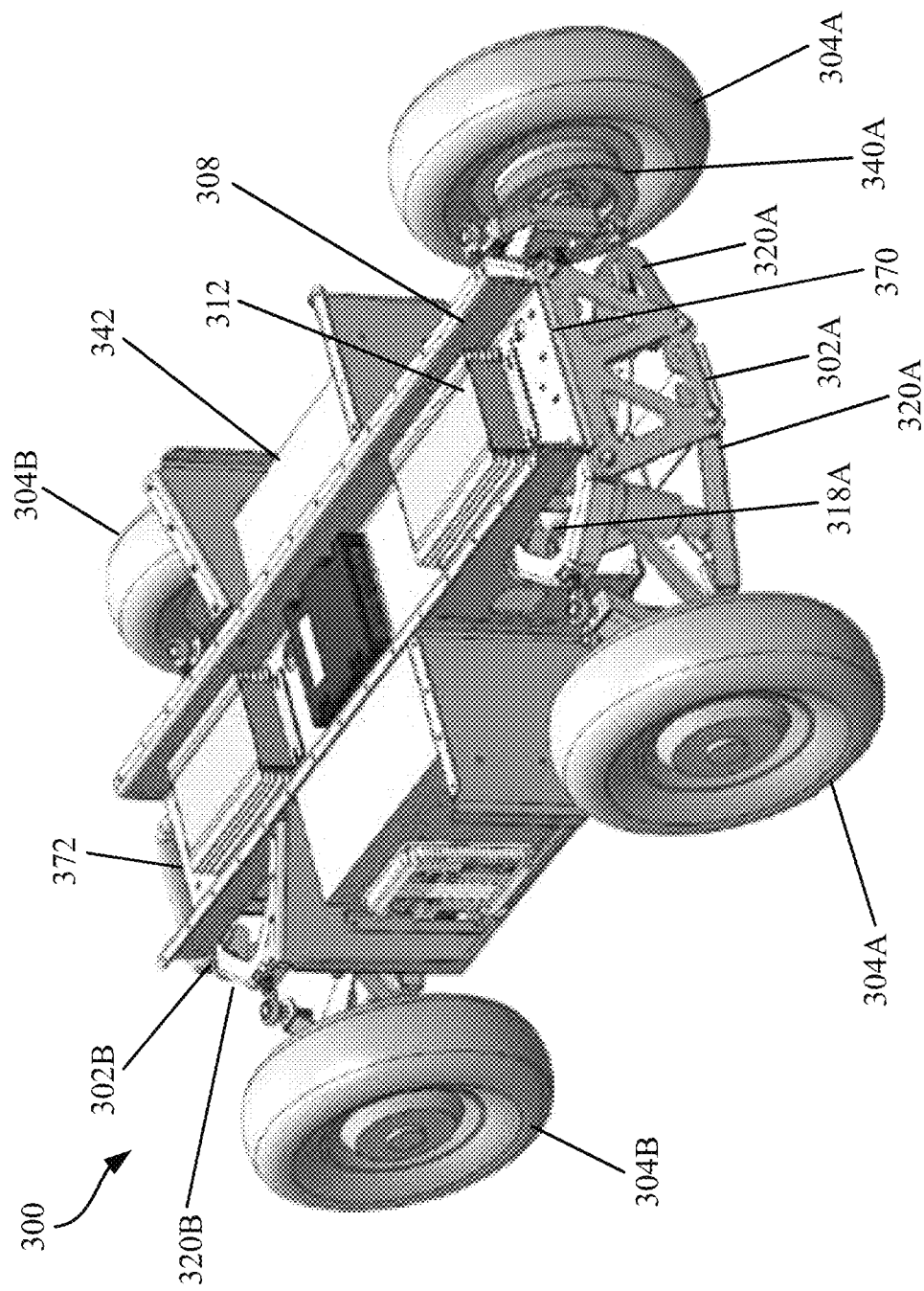
FIG. 3 illustrates a perspective view of a propulsion system of an automated perishable goods delivery system, in accordance with one or more embodiments.

FIG. 3 illustrates a perspective view of a propulsion system of an automated perishable goods delivery system, in accordance with one or more embodiments. FIG. 3 illustrates propulsion system 300 of a vehicle that includes control module 312, chassis 308 and drive modules 302A and 302B. Control module 312, chassis 308 and drive modules 302A and 302B are equivalent to control module 112, chassis 108, and drive modules 102A and 102B of FIGS. 1A, 1B, and 2. Chassis 308 further includes a battery housing 342 configured to receive a battery module such as battery module 106 described herein. Chassis 308 may be, for example, an extruded, sheetmetal, composite, or machined chassis. Chassis 308 may be formed of one or a plurality of parts. In various embodiments, various parts of chassis 308 may be bonded, welded, mechanically fastened (e.g., riveted or bolted together), or otherwise attached to form the complete chassis 308.

As shown, control module 312 is disposed on a second side of chassis 308 while drive modules 302A and 302B are disposed on a first side of chassis 308. Furthermore, as shown, drive module 302A is disposed on a first end 370 of chassis 308 while drive module 302B is disposed on a second end 372 of chassis 308. As such, drive modules 302A and 302B are disposed on opposing ends of chassis 308.

Mounting drive modules 302A and 302B on the ends of chassis 308 may allow for vehicle 100 to be operated in both forward and backward directions at the same speeds. In certain such embodiments, drive module 302A may, for example, power vehicle 100 when vehicle 100 is traversing in a direction towards first end 370 and drive module 302B may power vehicle 100 when vehicle 100 is traversing in a direction towards second end 372, or vice versa. Other embodiments may include drive modules 302A and 302B both providing power at the same time for vehicle 100 (e.g., providing four wheel drive).

Drive modules 302A and 302B may be disposed in mirrored orientations. The mirrored orientations may allow for better maneuverability of the vehicle by, for example, allowing for the wheels of drive modules 302A and 302B to be steered in opposing directions while maintaining the desired level of Ackerman steering geometry. Furthermore, in such mirrored orientations, motors 340A and 340B (not shown, but mounted on drive module 302B and equivalent to motor 640B in FIG. 6), may be configured to operate at full speeds in a plurality of drive directions (e.g., forward and backward). Such motors may, thus, be operated full speed regardless of which end drive modules 302A and/or 302B are installed at, allowing for vehicle 100 to be operated at full speed in four wheel drive mode and also to provide full electronic braking. In other embodiments, the motors may be configured to provide power in primarily one direction and drive modules 302A and 302B may be disposed in mirrored orientations so that at least one drive module may provide motive power.

Drive modules 302A and 302B may also include steering mechanisms (e.g., steering mechanisms 318 shown in FIGS. 4 and 5) that can orient wheels 304A and 304B of drive modules 302A and 302B in a desired direction. In certain embodiments, steering mechanisms of one or both of drive modules 302A and/or 302B can be locked. As such, one steering mechanism may be locked and another may be movable to allow for steering with only one axle. Greater stability can accordingly be imparted to vehicle 100. Additionally, the steering mechanisms of a plurality of drive modules may be operated at the same time. Such a configuration may increase the maneuverability of vehicle 100. For example, orienting a plurality of steering mechanisms in the same direction, by turning the wheels turning in the same direction, may allow for greater stability of vehicle 100 while maneuvering. Orienting a plurality of steering mechanisms in different directions, by turning the wheels turning in different directions, may allow for greater maneuverability of vehicle 100 (e.g., a tighter turning circle).

In various embodiments, drive module 302A may include wheels 304A, suspension 320A, steering mechanism 318A, and motor 340A. Drive module 302B may include corresponding components. In certain embodiments, motor 340A may be disposed within wheel 304A (e.g., disposed within a center portion of the wheel). Motor 340A may be configured to accelerate or decelerate the vehicle. Thus, motor 340A may be a braking system as well. In various embodiments, each wheel 304A may contain a motor 340A.

Figure 4:
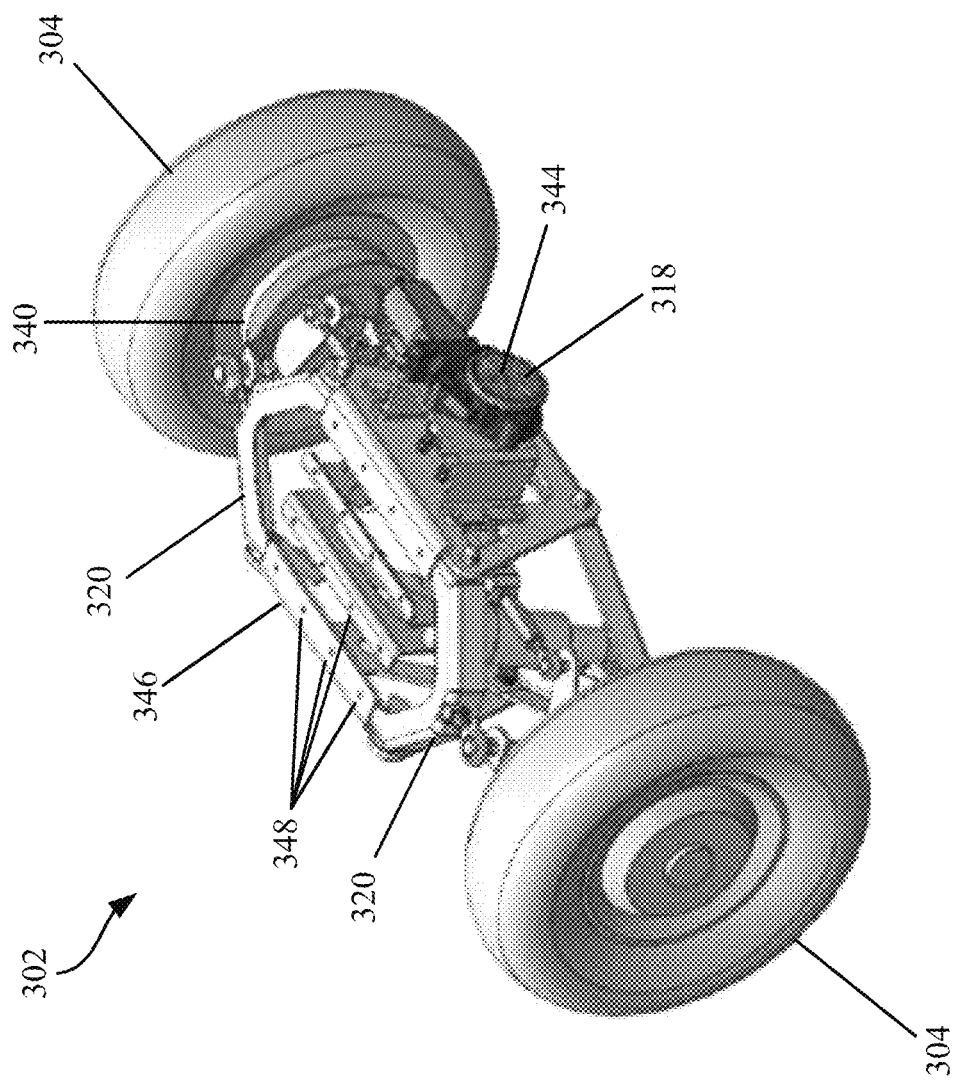
FIG. 4 illustrates a perspective view of a drive module of a propulsion system of an automated perishable goods delivery system, in accordance with one or more embodiments.

Drive module 302 may be further illustrated in FIG. 4. FIG. 4 illustrates a perspective view of a drive module of a propulsion system of an automated perishable goods delivery system, in accordance with one or more embodiments. FIG. 4 illustrates drive module 302 with wheels 304, suspension 320, steering mechanism 318, and subframe 346. In certain embodiments, drive module 302 may include one or more control systems, processors, or memory to control operation or sense various parameters of various components of drive module 302.

Subframe 346 may couple to chassis 308 through connections 348. Connections 348 may be openings that allow for fasteners to be disposed within and connect to chassis 308 to couple subframe 346 to chassis 308. In various embodiments, subframe 346 (and, thus, drive module 302) may be coupled to chassis 308 through fastening techniques such as through the use of one or more catches, toggle clamps, quick release fasteners, threaded fasteners, and/or other connections. Additionally, coupling subframe 346 to chassis 308 may include coupling together data connections such as data connectors.

Suspension 320 may be a control arm, strut, trailing arm, beam axle, or other style of suspension configured to absorb surface imperfections. Suspension 320 may include one or more springs or dampers to absorb such imperfections. Suspension 320 may include at least four inches of travel to traverse over ramps, curbs, and other obstacles. The dampers may be of fixed damping or adjustable damping and may further include fixed or adjustable bump stops, anti-roll bars, spring perches, and other components. Suspension 320 may further include an upright and a hub configured to spin and couple to wheel 304.

In an exemplary embodiment, wheel 304 may include a 10-15 inch diameter solid wheel (e.g., a metal or composite wheel) and a tire (either pneumatic or airless) mounted on the wheel. The tires may be treaded for a city environment. Motor 340 may be one or more brushless hub motors or another such motor. For example, four or more brushless hub motors of 500 Watts or less and a diameter of 12 inches or less may be used. The motors may utilize a plurality of Hall effect sensors for low speed commutation and measurement of the speed of wheel 304. In various embodiments, wheel 304 may be mounted to a hub of suspension 320 through long life sealed ball bearings.

In various embodiments, motor 340 may be controlled through one or a plurality of motor controllers of drive module 302. Such motor controllers (e.g., module controller 660A) may receive instructions from control module 312 and provide corresponding instructions to one or a plurality of motor 340. In certain embodiments, control module 312 may provide instructions directed to an objective (e.g., for a module to provide a specific deceleration force or to provide a specific yaw rate). The drive module controller may receive the instructions and determine appropriate responses (e.g., accelerating or decelerating the motor accordingly, providing steering of a specific amount) from such commands. As drive module 302 includes various sensors that may determine different parameters (e.g., steering angle, wheel slip, acceleration force, and other parameters), the drive module controller may determine appropriate instructions for operation of various components of drive module 302 based on the commands received.

In certain embodiments, motors 340 may include an integrated brake or drive module 302 may include a brake external to motor 340 (e.g., a disc or drum hydraulic brake). Drive module 302 may include a master cylinder operated by electric motors or through a solenoid that then operates the brakes. The brakes may provide deceleration force to vehicle 100. A controller of vehicle 100 may determine whether to use motor 340 to provide regenerative braking or use the brakes to decelerate vehicle 100. In certain embodiments, regenerative braking may be used unless braking forces exceeding a threshold is required, in which case the brakes are used to further decelerate vehicle 100. Furthermore, if failure of the brakes is detected or additional deceleration is commanded, motor 340 may be used to provide further deceleration.

Wheel 304 may be oriented by steering mechanism 318. Steering mechanism 318 includes steering motor 344 that can electronically operate steering mechanism 318 to steer the vehicle based on instructions received (e.g., from the control module). Steering mechanism 318 may be, for example, a rack-and-pinion steering system and steering motor 344 may be, for example, a worm gear motor that operates steering mechanism 318 through a shaft coupling. In certain such embodiments, steering motor 344 may include a slip clutch. Steering mechanism 318 may also include a separate steering controller that receives instructions from another controller (e.g., the control module) and operates steering mechanism 318 and/or steering motor 344 accordingly. In other embodiments, such a controller may be integrated with a controller associated with drive module 302 (e.g., drive module 302 may include a controller configured to provide instructions for operation of various components of drive module 302). In various embodiments, steering motor 344 may include a single motor or a plurality of motors (e.g., permanent magnetic motors or brushless motors). Steering motor 344 may be configured to quickly turn the position of steering mechanism 318 (e.g., capable of operating steering mechanism 318 to turn from end to end in one second or less). Gear reduction may be used to reduce load on steering motor 344.

Figure 5:
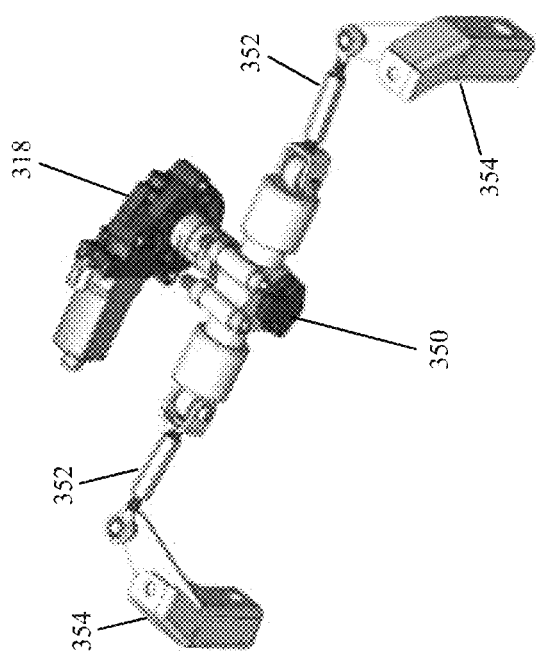
FIG. 5 illustrates a perspective view of a steering system of a drive module, in accordance with one or more embodiments.

Steering mechanism 318 may orient the wheels of drive module 302 through tie-rods coupled to the upright or hub. FIG. 5 illustrates a perspective view of a steering system of a drive module, in accordance with one or more embodiments. FIG. 5 illustrates steering mechanism 318 with steering rack 350. Steering rack 350 may be a rack and pinion, recirculating ball, or other type of steering rack. Steering rack 350 may be coupled to tie rods 352 to control an orientation of uprights 354. By controlling the orientation of uprights 354, steering mechanism 318 may control orientation of the wheels of the drive module.

Steering rack 350 may include a position sensor to determine a position or steering angle of steering mechanism 318. The position sensor may include a magnet on the pinion and a rotary magnetic position sensor mounted externally on steering mechanism 318 for steering position feedback. Steering mechanism 318 may include various different geometries such as pure Ackerman, reduced Ackerman, or no Ackerman geometries.

Figure 6:
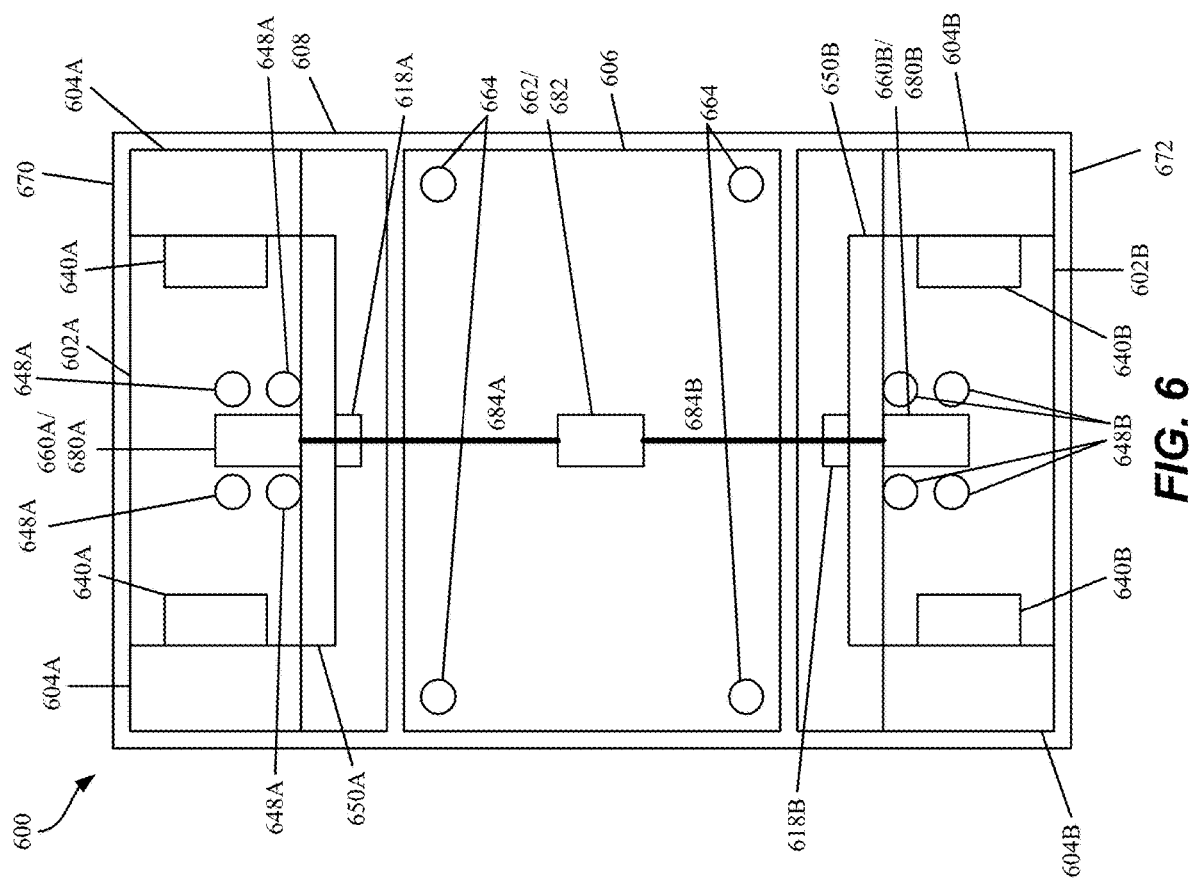
FIG. 6 illustrates a system representation of a propulsion system of an automated perishable goods delivery system, in accordance with one or more embodiments.

FIG. 6 illustrates a system representation of a propulsion system of an automated perishable goods delivery system, in accordance with one or more embodiments. FIG. 6 illustrates vehicle 600 that includes chassis 608, drive modules 602A and 602B, and battery module 606.

As shown, drive modules 602A and 602B and battery module 606 may be quick release modules that may couple to chassis 608 through quick release fasteners as described herein. Thus, for example, drive module 602A may couple to chassis 608 through quick release fasteners 648A, drive module 602B may couple to chassis 608 through quick release fasteners 648B, and battery module 606 may couple to chassis 608 through quick release fasteners 664. As shown, quick release fasteners 648A and 648B may be centrally disposed on drive modules 602A and 602B to simplify technician access. Quick release fasteners 664 may be disposed on a periphery of battery module 606. Different modules may include such different techniques of disposing fasteners.

Drive modules 602A/B may also include wheels 604A/B, motors 640A/B, steering mechanisms 618A/B with steering racks 650A/B, and drive module controllers 660A/B. Wheels 604A/B, motors 640A/B, and steering mechanisms 618A/B may be as described herein. Drive module controllers 660A/B may include circuitry, processors, and/or memories configured to receive instructions from another controller (e.g., control module 112) and determine instructions for operation of various components (e.g., motors 640A/B and steering mechanisms 618A/B) of drive modules 602A/B. In certain such embodiments, drive module controller 660A/B may include a connector configured to couple to connector 680A/B. Thus, data may be provided from connector 680A/B to drive module controller 660A/B.

Connectors 680A/B may be coupled to chassis 308. In various embodiments, circuitry 684A/B may provide data signals to connectors 680A/B and, thus, can be a data connection. The data signals may be received from connector 682 from, for example, control module 112. Additionally, circuitry 684A/B may provide electrical power to connectors 680A/B. Thus, connector 682 may be connected to connector 662 of battery module 606. Electrical power from battery module 606 is then provided to drive modules 602A/B through circuitry 684A/B and associated connectors.

Figure 7:
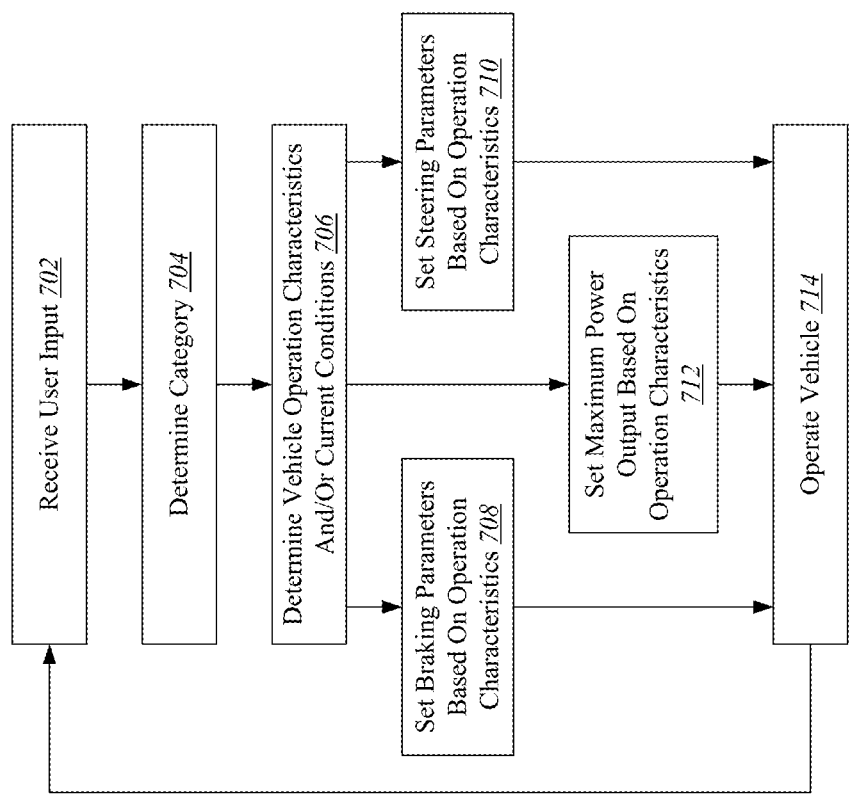
FIG. 7 illustrates an example flow process for operation of an automated perishable goods delivery system, in accordance with one or more embodiments.

FIG. 7 illustrates an example flow process for operation of an automated perishable goods delivery system, in accordance with one or more embodiments. FIG. 7 illustrates a technique of operating vehicle 100 based on a category of cargo carried by vehicle 100.

In step 702, user interface 116 may receive a user input. In other embodiments, the input may be communicated wirelessly (e.g., as data through a Bluetooth® connection from an organization that is loading vehicle 100). The user input may indicate a category of cargo carried by cargo module 110 of vehicle 100 and control module 112 may determine a category of cargo in step 704. Certain user inputs may indicate the category of every separate piece of cargo carried (e.g., if cargo module 110 is carrying multiple orders, one or multiple categories may be given for each order). In various embodiments, one or multiple categories may be determined and operation of vehicle 100 may be determined based on one, some, or all of the categories.

In step 706, vehicle operation characteristics may be determined based on the category or categories. The vehicle operation characteristics may be based on one, some, or all of the characteristics provided. Thus, for example, if vehicle 100 is carrying an order that is categorized as soup, the maximum target longitudinal or lateral acceleration or deceleration that control module 112 may command from drive modules 102 may be reduced. Furthermore, if vehicle 100 is carrying an order that is categorized as fragile, control module 112 may determine a smoother route or may adjust suspension 320 of vehicle 100 to be softer.

In certain embodiments, the vehicle operation characteristics may further be determined based on sensed conditions. That is, if various sensors of vehicle 100 determine that sensor readings from wheels 304 indicate slippage (due to, for example, a slick surface), control module 112 may decrease output of motor 340. Furthermore, vehicle operation characteristics may also be based on cargo carried within cargo module 110 at any point in time. During operation, vehicle 100 may delivery cargo to a plurality of different destinations. Certain cargo may be removed during delivery at a first destination while other cargo may be removed during delivery at a second destination. Thus, between the first and second destination, the categories of cargo carried by vehicle 100 may change as certain categories of cargo may be removed at the first destination. Control module 112 may adjust operating parameters of vehicle 100 based on the changes. Accordingly, if soup carried within cargo module 110 is removed, control module 112 may command a higher maximum acceleration, deceleration, or turn rate from drive modules 102.

Removal of categories of items from cargo module 110 may be determined by, for example, by sensors within cargo module 110. Cargo module 110 may include receptacles for each order. Control module 112 may store a category of the order associated with each receptacle within memory. When cargo module 110 senses (e.g., through a visual or weight sensor) that the order has been removed from within cargo module 110, data associated with the removal may be communicated to control module 112 and control module 112 may thus determine that the order has been removed and determine whether any other orders are also of the same category. If no other orders are of such a category, control module 112 may determine that such a category of cargo is no longer carried by vehicle 100.

Other embodiments may determine a delivery route for vehicle 100 and may include pre-programmed identifiers for items within vehicle 100. Control module 112 may store data indicating which items should be removed at each stop. After stopping at each stop, control module 112 may then automatically determine that the item is removed and determine if the category of items carried by vehicle 100 has changed. Such a determination may not include actual sensing of whether the cargo has been removed. Thus, cargo module 110 may not be equipped with such sensors, decreasing cost and complexity. Furthermore, delivery times for vehicle 100 on a route may be decreased as orders that are not picked up are ignored as a consideration when determining vehicle operating instructions. Though such orders, if they are not picked up at their specified destination, may be damaged by operating vehicle 100 more quickly, such damage may be acceptable as the orders would be disposed anyway of after vehicle 100 has returned to its operating hub.

Based on the determinations in step 706, braking parameters, steering parameters, and maximum power output may be determined in steps 708, 710, and 712, respectively. The braking parameters, maximum power output, and steering parameters may be calibrated to a specific maximum acceleration. Thus, for example, based on the determinations in step 706, control module 112 may provide instructions to limit the combined force vector of longitudinal acceleration and/or deceleration and lateral acceleration below a threshold amount. The forces may be limited by, for example, limiting a maximum power output of motor 340, limiting steering angle based on the velocity of vehicle 100, limiting a change in steering angle, and limiting braking force of vehicle 100. Additionally, the maximum jerk (e.g., change in acceleration) may also be limited based on the determinations.

Vehicle 100 may then be operated in step 714 according to according to the parameters determined in steps 708-712. Vehicle 100, during normal operation, may be configured to not exceed the parameters. However, in certain embodiments, control module 112 may allow for emergency maneuvers to exceed the limits established. Control module 112 may define emergency maneuvers in a variety of ways, such as maneuvers to vehicle avoid a collision. Vehicle 100 may then return to a service provider or depot for more items to be loaded for delivery. The process may then restart from step 702.

Figure 8:
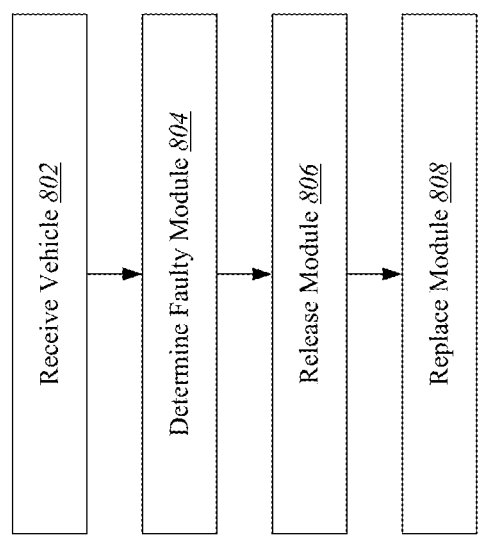
FIG. 8 illustrates an example flow process for maintenance and service of an automated perishable goods delivery system, in accordance with one or more embodiments.

FIG. 8 illustrates an example flow process for maintenance and service of an automated perishable goods delivery system, in accordance with one or more embodiments. In step 802, vehicle 100 is received by a service provider (e.g., an entity that fulfills orders for delivery or services vehicle 100) and/or a service depot.

In step 804, a faulty module is determined. In certain embodiments, diagnostic equipment may be used to determine a faulty module of vehicle 100. Otherwise, technicians may test or inspect modules to determine whether modules are properly functioning or faulty.

The faulty module may be released from vehicle 100 in step 806 by, for example, operating quick release mechanisms or removing fasteners holding the module to vehicle 100. The module may then be replaced with a properly functioning module in step 808. Vehicle 100 may thus be ready to continue deliveries. The faulty module may then be serviced and repaired.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A vehicle comprising:
a chassis comprising a first end and a second end and a first side and a second side; and
a plurality of quick release drive modules coupled to the chassis, each drive module comprising a plurality of wheels, a steering mechanism coupled to the plurality of wheels, and a motor configured to power the wheels, wherein at least one of the drive modules is disposed proximate to the first end on the first side, and wherein at least another of the drive modules is disposed proximate to the second end on the first side; and a controller communicatively coupled to the plurality of drive modules and configured to provide steering instructions to each of the steering mechanisms and to provide operating instructions to each of the motors, the controller configured to:
receive a first indication of a first category of cargo carried by the vehicle;
automatically limit, based on the receiving the first indication that the first category of cargo is carried by the vehicle and via the operating instructions, power output of the motor to a first limit;
receive a second indication that the first category of cargo has been removed from the vehicle; and
automatically cease limiting, based on the receiving the second indication that the first category of cargo has been removed from the vehicle and via the operating instructions, the power output of the motor to the first limit.

2. The vehicle of claim 1, wherein the plurality of drive modules comprise a first drive module and a second drive module, and wherein the first drive module and the second drive module are disposed in mirrored orientations.

3. The vehicle of claim 1, further comprising:
a battery coupled to the chassis on the first side and configured to power the plurality of drive modules.

4. The vehicle of claim 3, wherein the battery comprises a battery electrical connection, wherein the chassis further comprises a chassis electrical connection, and wherein the battery electrical connection is configured to connect to the chassis electrical connection to provide power from the battery to the drive modules.

5. The vehicle of claim 4, wherein the chassis further comprises a chassis circuit configured to receive power from the chassis electrical connection and provide power to one or more of the drive modules.

6. The vehicle of claim 3, wherein the battery comprises one or more battery electrical connections, wherein each of the plurality of drive modules comprise a drive module electrical connection, and wherein the battery electrical connections are configured to connect to the drive module electrical connections to provide power from the battery to the drive modules.

7. The vehicle of claim 1, wherein the controller is further configured to:
determine a direction of travel of the vehicle;
determine a first drive module disposed forward, according to the direction of travel, of a second drive module; and
provide steering instructions to the steering mechanism of the first drive module to change the direction of travel of the vehicle.

8. The vehicle of claim 7, wherein the controller is further configured to:
provide steering instructions to the steering mechanism of the second drive module to lock, in a first position, the steering mechanism of the second drive module while operating the steering mechanism of the first drive module.

9. The vehicle of claim 7, further comprising a user interface communicatively coupled to the controller, wherein the controller is further configured to:
receive the first indication from the user interface associated with an input from a user.

10. The vehicle of claim 9, wherein the controller is further configured to:
determine a velocity of the vehicle, wherein the steering instructions are based on the velocity of the vehicle and the first indication that the first category of cargo is carried by the vehicle.

11. The vehicle of claim 10, wherein the controller is further configured to:
receive a second indication of a second category of cargo carried by the vehicle; and
automatically limit, based on the receiving the second indication that the second category of cargo is carried by the vehicle and via the operating instructions, the power output of the motor to a second limit.

12. The vehicle of claim 7, wherein steering instructions further operate the steering mechanism of the second drive module when causing the vehicle to change the direction of travel.

13. The vehicle of claim 1, wherein the controller is disposed on the second side.

14. The vehicle of claim 1, wherein each of the plurality of drive modules is coupled to the chassis via a catch, toggle clamp, quick release fastener, or threaded fastener.

15. The vehicle of claim 1, wherein the motor of each of the drive modules is at least partially disposed within one of the wheels.

16. The vehicle of claim 1, further comprising:
a sensor suite disposed on the second side; and
a cargo container disposed on the second side.

17. A method comprising:
receiving a vehicle, wherein the vehicle comprises:
a chassis comprising a first end and a second end and a first side and a second side; and
a plurality of quick release drive modules coupled to the chassis, each drive module comprising a plurality of wheels, a steering mechanism coupled to the plurality of wheels, and a motor configured to power the wheels, wherein at least one of the drive modules is disposed proximate the first end on the first side, and wherein at least one of the drive modules is disposed proximate the second end on the first side; and
a controller communicatively coupled to the plurality of drive modules and configured to provide steering instructions to each of the steering mechanisms and to provide operating instructions to each of the motors, the controller configured to:
receive a first indication of a first category of cargo carried by the vehicle;
automatically limit, based on the receiving the first indication that the first category of cargo is carried by the vehicle and via the operating instructions, power output of the motor to a first limit;
receive a second indication that the first category of cargo has been removed from the vehicle; and
automatically cease limiting, based on the receiving the second indication that the first category of cargo has been removed from the vehicle and via the operating instructions, the power output of the motor to the first limit;
determining that at least one of the drive modules is faulty;
releasing the faulty drive module from the chassis; and
replacing the faulty drive module.

18. The method of claim 17, wherein the method further comprises:
   releasing a battery from the chassis; and
   replacing the battery.

19. The method of claim 17, further comprising:
   providing an input indicating the first indication of the first category of cargo carried by the vehicle through a user interface of the vehicle.

20. The vehicle of claim 11, wherein the steering instructions are based on the velocity of the vehicle and the second indication that the second category of cargo is carried by the vehicle.

\* \* \* \* \*